No. 807,558. PATENTED DEC. 19, 1905.
P. J. JAEGER.
FILTER APPARATUS.
APPLICATION FILED JUNE 3, 1902. RENEWED APR. 17, 1905.

4 SHEETS—SHEET 1.

Witnesses
Harry A Brooks
R. W. Pierce

Inventor
Philipp J. Jaeger
By
Charles S. Rogers
His Attorney

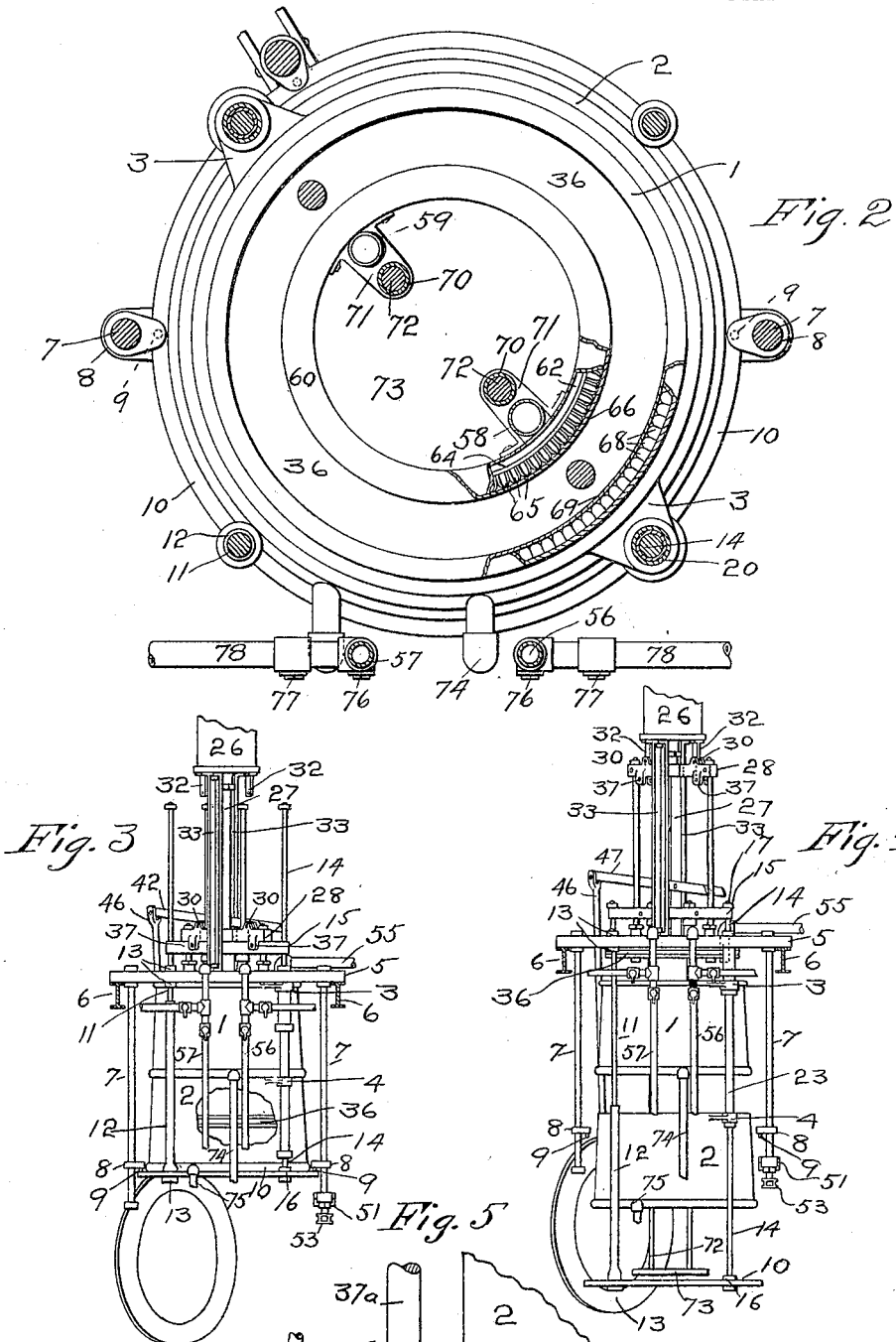

No. 807,558. PATENTED DEC. 19, 1905.
P. J. JAEGER.
FILTER APPARATUS.
APPLICATION FILED JUNE 3, 1902. RENEWED APR. 17, 1905.

4 SHEETS—SHEET 3.

Witnesses
Harry A. Brook
Mignon Ford

Inventor
Phillipp J. Jaeger
By Charles S. Rogers
his Attorney

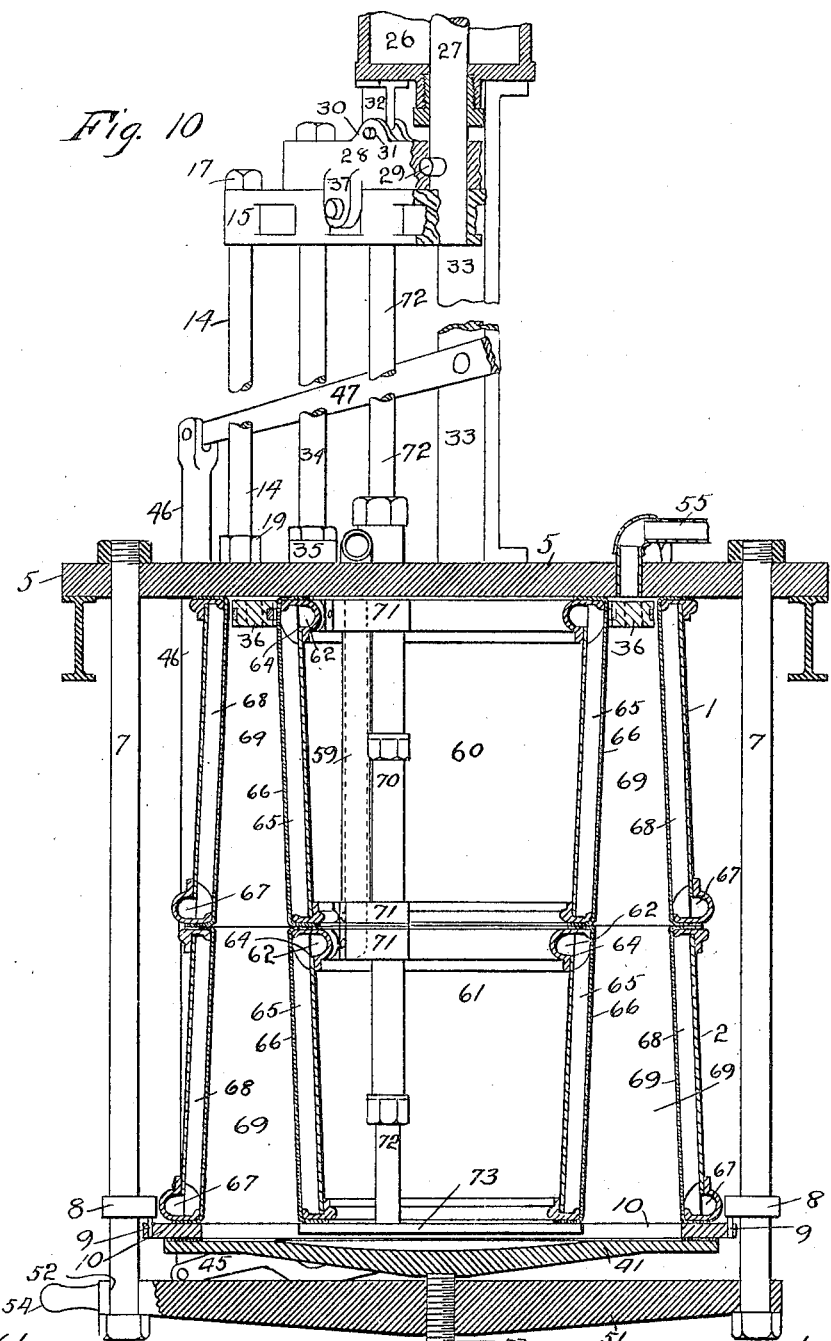

UNITED STATES PATENT OFFICE.

PHILIPP J. JAEGER, OF SANTA PAULA, CALIFORNIA, ASSIGNOR OF ONE-HALF TO JOHN B. McCLOSKEY, OF SANTA PAULA, CALIFORNIA.

FILTER APPARATUS.

No. 807,558.     Specification of Letters Patent.     Patented Dec. 19, 1905.

Application filed June 3, 1902. Renewed April 17, 1905. Serial No. 256,136.

*To all whom it may concern:*

Be it known that I, PHILIPP J. JAEGER, a citizen of the United States, residing at Santa Paula, in the county of Ventura and State of California, have invented a new and useful Filter Apparatus, of which the following is a specification.

This invention relates to apparatus for filtering, and particularly to apparatus to be used in sugar-factories and similar places; and some of the objects of this invention are to provide an apparatus of this character which will be comparatively cheap and simple in construction and at the same time efficient in operation.

Another object of the invention is to provide a filtering apparatus so constructed as to be capable of operation by machinery and one which dispenses with much of the manual labor now necessary to operate an apparatus of this general character.

It is also an object of this invention to provide a filtering apparatus wherein the cloths or strainers can be washed without removal from the apparatus and while in operative position therein.

Furthermore, by means of this invention a filtering apparatus is produced which is more efficient and cleaner in operation, is more easily handled, emptied, and dressed than apparatus of this character now in use, and occupies a small space.

With these and other objects in view the invention consists, essentially, in the construction, combination, and arrangement of parts substantially as more fully described in the following specification and illustrated in the accompanying drawings, forming part of this application, in which—

Figures 1, 6:
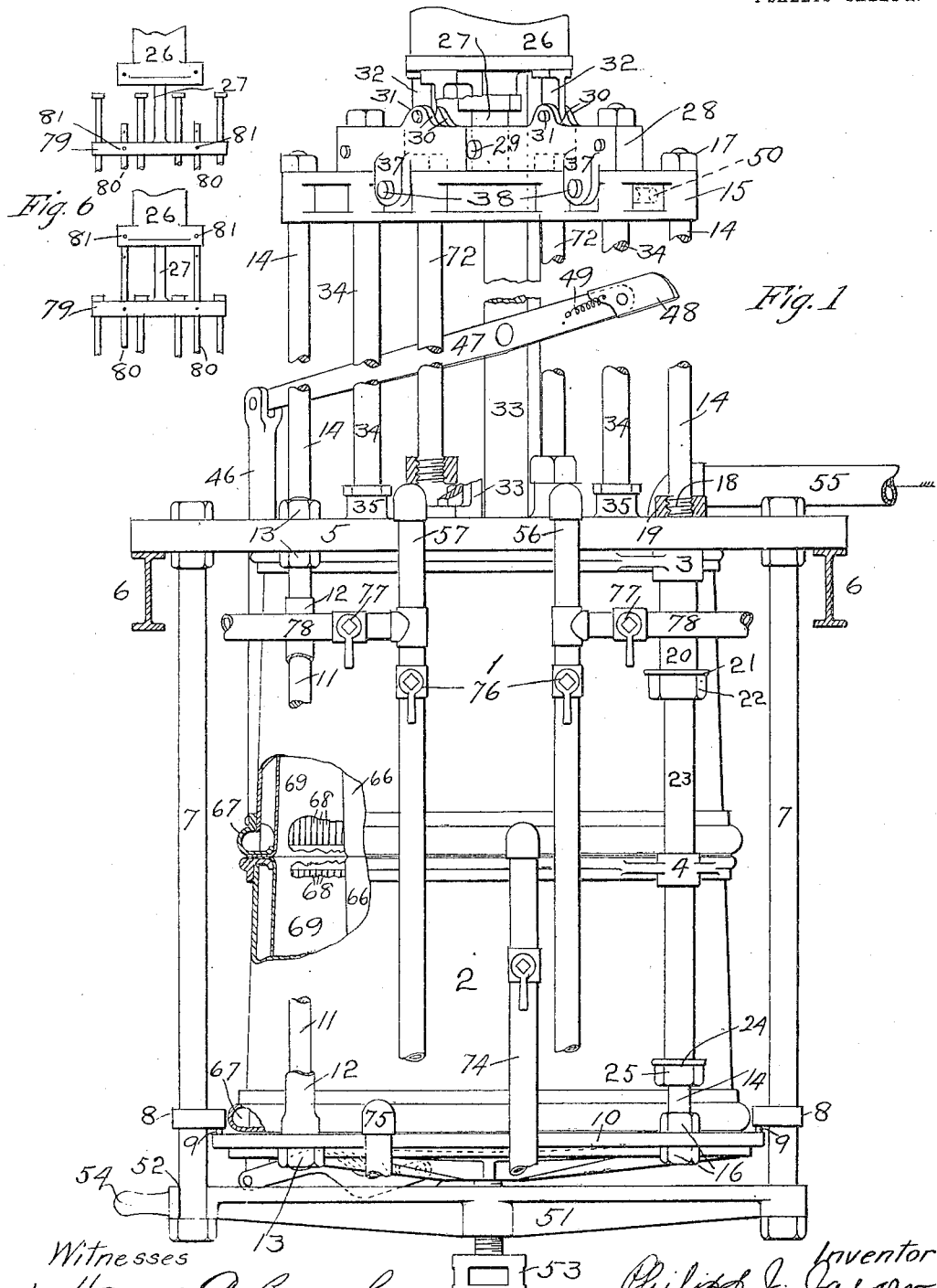
Figure 8:
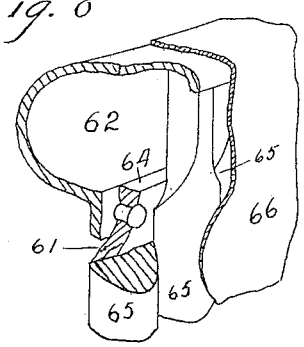
Figure 9:
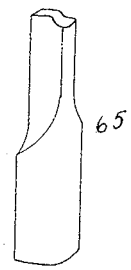
Figure 7:
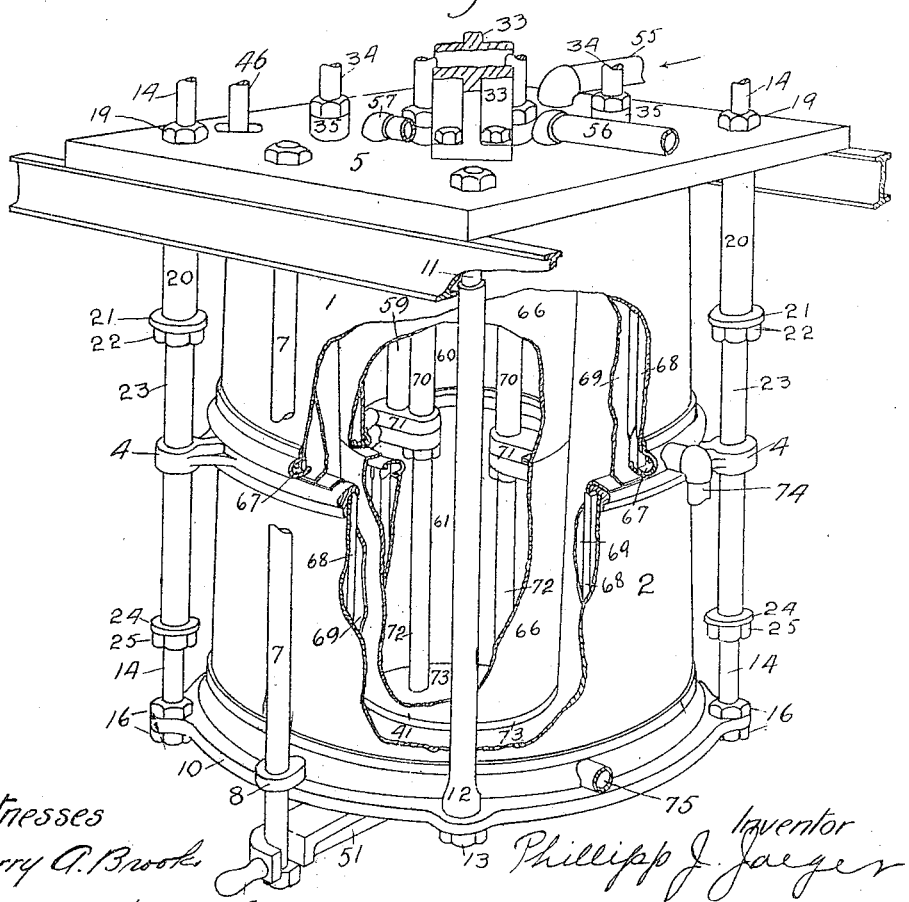

Figure 1 is a side elevational view, partly broken away and partly in section, of an apparatus embodying an application of the invention. Fig. 2 is a top plan view of the apparatus, partly broken away and partly in section, with the cover or head and superimposed parts removed. Fig. 3 is a side elevational view, on a small scale, partly broken away, showing the bottom disconnected or depending and the plunger in the discharging position. Fig. 4 is a view similar to Fig. 3, illustrating the parts in position for dressing the apparatus. Fig. 5 is an enlarged detail view of portions of the mechanism for operating the bottom of the apparatus. Fig. 6 illustrates modified forms of construction. Fig. 7 is a perspective view of the apparatus, parts thereof being broken away to illustrate the interior construction. Figs. 8 and 9 illustrate details of the construction, and Fig. 10 is a longitudinal central sectional view of the apparatus on an enlarged scale.

Similar characters of reference designate corresponding parts throughout the several views.

Although this invention is in no manner limited to the following use, nevertheless it is particularly adapted for the art of beet-sugar manufacture, wherein the beets are first cut up and then put in a battery where the juice and sugar are separated from the pulp or solid substance of the beets. Then the juice goes to a cooler, where it is agitated and where lime is added and mixed therewith for the purpose of destroying the pulp and other solid matter or for defecation, whereupon the juice and lime is conveyed into the press, hereinafter described, through the inlet-pipes.

Referring to the drawings, and particularly to Figs. 1 to 5 thereof, there is illustrated two circular portions 1 and 2, which are preferably frusto-conical and may be of any desired number and may be constructed to telescope, if found desirable in practice, and formed on or connected with the portions 1 and 2, respectively, are guides or brackets 3 and 4, any number whereof may be employed.

A top or head 5 is shown as resting upon I-beams 6, Fig. 1, as a means of supporting the apparatus; but it will be understood that the apparatus may be supported in any manner that is found desirable in practice. Secured to the top or head 5 by nuts or otherwise are depending bars or rods 7, preferably provided with collars 8, carrying pins 9 to enter and center the movable rim 10, connected with the head 5 by rods 11, working in sleeves 12, secured to the rim 10, said rods being secured in position by nuts 13 to support the ring 10 and portions 1 and 2 when the apparatus is in operative position and to move within the sleeves 12 after the nuts 13 below said ring 10 shall have been removed, when the parts are separated or disconnected, as shown in Fig. 4 of the drawings.

Elevating-rods 14 are preferably connected with the ring 10 by nuts 16 and with a cross-head 15 by a nut 17, and the rods 14 are preferably provided with an intermediate screw-threaded portion 18 to receive a nut 19 to afford additional support for the ring 10 when the parts are in operative position, and when it is desired to disconnect or separate the parts the nuts 19 are unscrewed and the nuts 13 on the rods 11 are likewise removed, whereupon the parts may be disconnected, as hereinafter explained.

Sleeves 20 are preferably connected with the head or cover 5 and may be provided with an annular rim or flange 21, below which is preferably cut a screw-thread to receive a nut 22, and the sleeves 20 may be reduced in diameter, as at 23, and pass through guides or brackets 4 upon the lower portion 2, and the reduced sleeves 23 may be provided with a flange or rim 24 and with a removable nut 25, by means of which construction the nuts 22 and 25 may be removed and the sleeves 23 may be withdrawn from the guides or brackets 4 and the sleeves 20 withdrawn from the guides or brackets 3 to permit the disconnection and removal of the parts when necessary.

A hydraulic or other cylinder 26 may be suitably mounted above the apparatus and provided with a piston-rod 27, removably connected with a frame 28 by means of a pin 29, and the frame is preferably provided with lugs or ears 30, having openings to receive a removable pin 31, passing therethrough and through depending links 32 upon the bottom of the cylinder 26 to normally maintain the frame in an elevated position, and the cylinder 26 may be supported upon a plurality of supports or bars 33, secured to the head 5 of the apparatus, substantially as shown.

Rods 34 are supported in the frame and pass through stuffing-boxes or glands 35 into the apparatus to support an annular plunger 36, Figs. 3 and 4 of the drawings, and the plunger is normally elevated or supported adjacent to the head 5 when the frame 28 is connected to the cylinder, as just described; but when it is desired to depress the plunger and force out the accumulated material (such as lime and the residue separated from the juice within the portions 1 and 2) the pins 31 are removed, thereby disconnecting the frame 28 and the cylinder 26, so that the piston-rod 27, connected with said frame, can depress the plunger.

The frame 28 is preferably provided with lugs or ears 37, by means of which the frame 28 can be detachably connected with the cross-head 15 by means of removable pins 38, and when connected both the frame 28 and cross-head 15 will be depressed upon the descent of the piston 27, thereby lowering both the plunger 36, carried by the rods 14, and the portions 1 and 2, the necessary supporting-rods having been previously removed, as shown in Fig. 4 of the drawings.

A bar or tube 37$^a$, Fig. 5, is preferably secured to the head or cover 5 and is provided with a collar 8$^a$, carrying an engaging pin 9$^a$ to enter the ring 10 to support the lower end of the bar or tube 37$^a$, which is bifurcated at the free lower extremity thereof, and the bifurcated portions are provided with longitudinal slots 38$^a$ to receive pins 39, passing through extensions 40 upon the bottom 41, also constructed with a slot 42, wherein is mounted a pin 43, carried by the bifurcated extremity 44 of the bottom operating-lever 45, intermediately pivoted in the bifurcated end of the bar or tube 37$^a$ and carrying a pull-rod 46, pivotally connected with one end of a tripping-lever 47, movably connected with one of the supports 33, Fig. 1, and having a movable extremity 48, normally retracted into an immovable position by a spring or other device 49, so that the pin 50 in the cross-head 15 will pass over or depress the movable extremity 48 upon the descent of the frame; but said pin will operate the lever 47 upon the elevation of the frame, so as to depress the pull-rod 46 and close the bottom 41, as shown in Fig. 5 of the drawings.

A supporting-bar 51 is preferably mounted upon one of the depending bars 7 and provided with a notch or recess 52, near the other end thereof, to engage the other bar 7, and the supporting-bar 51 is preferably provided with a set-screw 53 to bear against the bottom 41 and seat the same tightly, and a handle 54 may be provided upon the supporting-bar 51 to facilitate the operation thereof.

One or more inlet-pipes 55 may be connected with the apparatus and with the source of supply, (not shown,) whereby saccharine matter (such as juice extracted from sugar-beets after the same shall have been cut up and mixed with lime and other materials to remove other matter from the juice) may be introduced into the apparatus, and outlet-pipes 56 and 57, Fig. 1, pass into the apparatus and depend therein a sufficient distance to be suitably connected, as by telescopic joint, with vertical pipes 58 and 59, carried by the upper and lower interior cylinders 60 and 61, respectively, of the apparatus and in communication with the annular chambers 62 thereof, into which chambers the saccharine matter flows over the upper edge 64 of the cylinders, Fig. 2, after passing between the space bars or segments 65, surrounded by inclosing fabric 66, the ends whereof are preferably lapped upon and suitably secured to the ends of the sections or portions 1 and 2, through which the saccharine matter filters before reaching the spacing-bars 65, as will be readily understood.

The upper and lower exterior portions or cylinders 1 and 2 are provided with annular chambers 67, Fig. 1, which receive the saccharine matter that passes between the space-bars 68 after having filtered through the fabric 69, stretched thereover, substantially as before explained.

Formed on or connected with the head or top 5 are depending sleeves 70, having screw-threaded portions to receive nuts, which support the upper and lower interior cylinders 60 and 61, respectively, by means of the apertured lugs 71 thereon, Fig. 2, substantially in the manner that the upper and lower exterior portions or cylinders 1 and 2 are supported upon the sleeves 23, Fig. 1 of the drawings.

Within the sleeves 70 are movably mounted rods 72, suitably connected with a supporting-disk 73 and passing up through the apparatus and engaging the cross-head 15, as shown in Fig. 1 of the drawings, whereby the supporting-disk 73 is elevated, thereby elevating and supporting the interior cylinders 60 and 61 in operative position by the action of the cross-heads 15, and connected part, as hereinbefore explained.

The operation of the apparatus will be readily understood from the foregoing description, when taken in connection with the accompanying drawings and the following explanation thereof.

Assuming the parts to be in operative position, then the saccharine matter, together with lime or its equivalent, is introduced into the apparatus between the fabric 69 upon the exterior cylinders 1 and 2 and the fabric 66 upon the interior cylinders 60 and 61 by means of the inlet-pipe 55, Fig. 1, whereupon the saccharine matter filters through the fabric 69, between the space-bars 68 into the annular chamber 67 upon or in the lower portion of the upper and lower cylinders 1 and 2, from which the filtered matter is withdrawn, respectively, by the outlet-pipes 74 and 75, each of which may be provided with a cut-off to control the flow of filtered matter from each of the exterior cylinders 1 and 2. Some of the saccharine matter will also pass through the fabric 66 between the space-bars 65 until the same shall have overflowed the upper edge 64 of the cylinders, Fig. 2, into the annular chamber 62, from whence the filtered matter will be forced from the apparatus through the pipes 58 and 59 and 56 and 57, Fig. 1, by the fresh material which is forced into the apparatus through the inlet-pipe 55.

To remove any saccharine matter yet remaining in the apparatus, the valves 76 in the pipes 56 and 57 are closed and the valves 77 in the water-pipes 78, Fig. 1, are open, thereby admitting water into the pipes 58 and 59 of the upper and lower interior cylinders 60 and 61, into and through the annular chamber 62 and 63 of said cylinder between the space-bars 65, through the fabric 66 into the lime, &c., accumulated between the fabric 66 of the interior cylinders and the fabric 69 of the exterior cylinder, then through the latter fabric and between the space-bars 68 into the annular chambers 67 of the exterior cylinders 1 and 2, and finally out through the outlet-pipes 74 and 75 thereof to a suitable receptacle.

To remove the lime, &c., from the space between the exterior and interior cylinders, the nut on the rod 7, Fig. 1, is loosened after the set-screw 53 has been released, and the supporting-bar 51 is swung to one side, as shown in Fig. 3, whereupon the bottom 41 will drop down into the position shown in Figs. 3 and 4 of the drawings, and the pins 31 will be removed from the frame 28, permitting the latter and the cross-head 15 to be forced downwardly by the piston-rod 27 in the cylinder 26, thereby depressing the annular plunger 36, carried by the rods 34, whereby the lime, &c., will be forced from the apparatus, the action being facilitated by the frusto-conical construction of all of the cylinders.

When it is desired to dress or renew the fabrics 66 and 68, the nuts 13 are loosened and the nuts are removed from the intermediate portion of the rods 14 and 72. The piston 27 having returned the cross-head 15 and frame 28 to the elevated position shown in Fig. 1 of the drawings, the pins 31 are again secured in position to support the plunger 36, and the pins 38 are removed, thereby disconnecting the frame 28 and cross-head 15, which latter thereupon descends, permitting the exterior and interior cylinders to fall until the guides or brackets 3 and 4 of the exterior cylinders rest, respectively, upon the annular rims 21 and 24 of the sleeves 23, and the guides or brackets 71 upon the interior cylinder engage stop-nuts or rims upon the sleeves 70, Fig. 2, as before explained, whereupon the parts will be in a position illustrated in Fig. 4 of the drawings, and free access will be afforded to the interior portion of the apparatus.

In Fig. 6 of the drawings there is illustrated a modified construction of a portion of the apparatus wherein a cross-head 79 is employed, connected with the piston-rod 27 from the cylinder 26; but the frame 28 is omitted and the plunger-rods 80 are provided with a series of openings to receive pins 81, whereby the plunger 36 may be supported while the parts of the apparatus are separated, as before described.

If found desirable in practice, the exterior and interior cylinders may be constructed in one piece, and the former may have screw-threaded connection with the head or cover 5, and the parts rendered unnecessary thereby could be dispensed with, and steam may be employed instead of water for discharging the apparatus.

It is not desired to confine this invention to the specific construction, combination, and arrangement of parts herein shown and described, and the right is reserved to make all such changes in and modifications of the same as come within the spirit and scope of the invention.

I claim—

1. An apparatus provided with an independent exterior and interior cylindrical filter, means for introducing material between said filters so that it will filter out through the exterior filter and in through the interior filter and separate connections for withdrawing the filtered material from the outside of the former and the inside of the latter filter.

2. An apparatus provided with sectional interior and exterior filters, devices for supporting the sections and means for introducing material between the interior and exterior portions of each section and separate connections for withdrawing the material filtered from the outside of the exterior portion and the inside of the interior portion.

3. An apparatus provided with a filter embodying an upper and lower section constructed with an exterior and interior filter portion, means for supporting said sections in contact and at a distance from each other, a device for introducing the material between the inner and outer filter portions and means for withdrawing the filtered material from the outside of the outer portion and from the inside of the inner portion.

4. An apparatus provided with interior and exterior sectional filter-cylinders, means for supporting the same one above the other in operative and disconnected positions and connections for supplying the material to be filtered and withdrawing the filtered material.

5. An apparatus provided with sectional filter-cylinders, supported one above the other, a head or cover supporting the same, a ring below the cylinders and bolt-rods constructed to engage the head and ring to support the sections in operative and separated positions and connections for supplying and withdrawing the material.

6. An apparatus provided with sectional cylinders, a head or cover supporting the same, a ring below the cylinders bolt-rods constructed to engage the head and ring to support the section in operative and separated positions and means connected to said rods and with a source of power to cause the discharge of the substance within the cylinders.

7. An apparatus provided with a body portion, a bottom a lever having a section movable in one direction, connection between said lever and bottom and a source of power carrying a device constructed to engage said lever-section in the immovable direction to close said bottom.

8. An apparatus provided with a body portion, a cross-head connected with the source of power, a ring-plunger in said body portion and connection between the same and said cross-head to discharge the substance in said body portion.

9. An apparatus provided with independent exterior and interior filters, means for introducing the material between said filters, space-bars inside of the exterior filter and outside of the interior filter, filtering fabrics over said bars and means for withdrawing the filtered material from beyond said bars of each filter.

10. An apparatus provided with an exterior filter having internal space-bars covered by filtering fabrics and having an annular exterior receiving-chamber for the filtered material, an interior filter having external space-bars covered by filtering fabrics and an internal receiving-chamber for the filtered material, connections for withdrawing the filtered material from said chambers and inlet connections.

11. An apparatus provided with a cylindrical sectional exterior filter, means for supporting said section in operative and separated positions, each of said sections having space-bars covered by a filtering material and an annular external chamber for the filtered material, cylindrical sectional internal filters having space-bars covered with filtering material and having an internal receiving-chamber for the filtered material, means for supporting said internal section in operative and separated positions, connections with said receiving-chambers for withdrawing the filtered material therefrom and connection for introducing the material to be filtered between said external and internal filters.

12. An apparatus provided with a cylindrical external filter having space-bars covered by filtering material and having an annular external chamber for the filtered material, an internal cylindrical filter having space-bars covered by filtering material and having an annular internal chamber for the filtered material, connections with said chambers for withdrawing the filtered material therefrom, a connection for introducing the material to be filtered between said filters, an annular plunger to remove the foreign material from between said filters and mechanism for operating said plunger.

13. An apparatus provided with an external sectional filter having space-bars covered by filtering material and a receiving-chamber beyond said bars, connections for withdrawing from said chambers the filtered material, a connection for introducing the material to be filtered, internal sectional filters each having space-bars covered by filtering material and having receiving-chamber for the filtered material, a head or cover for said apparatus provided with extensible rods to support said external and internal sections in operative and separated positions, an annular plunger between said external and internal filters and mechanism for operating said plunger.

14. An apparatus provided with sectional exterior and interior filters provided with filtering means and having receiving-chambers for the filtered material, means for withdrawing material therefrom, a connection for introducing the material to be filtered, a top or cover provided with extensible rods to support said sections in different positions, an annular plunger between said filters, mechanism for operating the plunger and for supporting the same in inoperative position, a bottom for the filter and devices for closing said bottom and retaining the same in closed position.

15. An apparatus provided with sectional filters having filtering means and receiving-chambers, means for withdrawing the filtered material from said chambers, a connection for introducing the material to be filtered, a top or cover provided with extensible rods to support said sections in different positions, an annular plunger between said filters, mechanism for operating the plunger and for supporting the same in inoperative position, a bottom for the filter, devices operated by the elevation of the plunger to close said bottom, a supporting-bar for said bottom, and means for washing the filtering material.

16. An apparatus provided with sectional filters having filtering means and receiving-chambers, means for withdrawing the filtered material from said chambers, a connection for introducing the material to be filtered, a top or cover provided with extensible rods to support said sections in different positions, means for removing the solid matter from the apparatus and connections for washing the filtering material.

In testimony whereof I have signed my name to this specification in the presence of two subscribing witnesses.

PHILIPP J. JAEGER.

Witnesses:
AMELIA GUEST,
L. B. ALDERETE.